H. L. WEST.
PRESSURE GAGE FOR VEHICLE TIRES.
APPLICATION FILED AUG. 5, 1918.
1,300,534.
Patented Apr. 15, 1919.
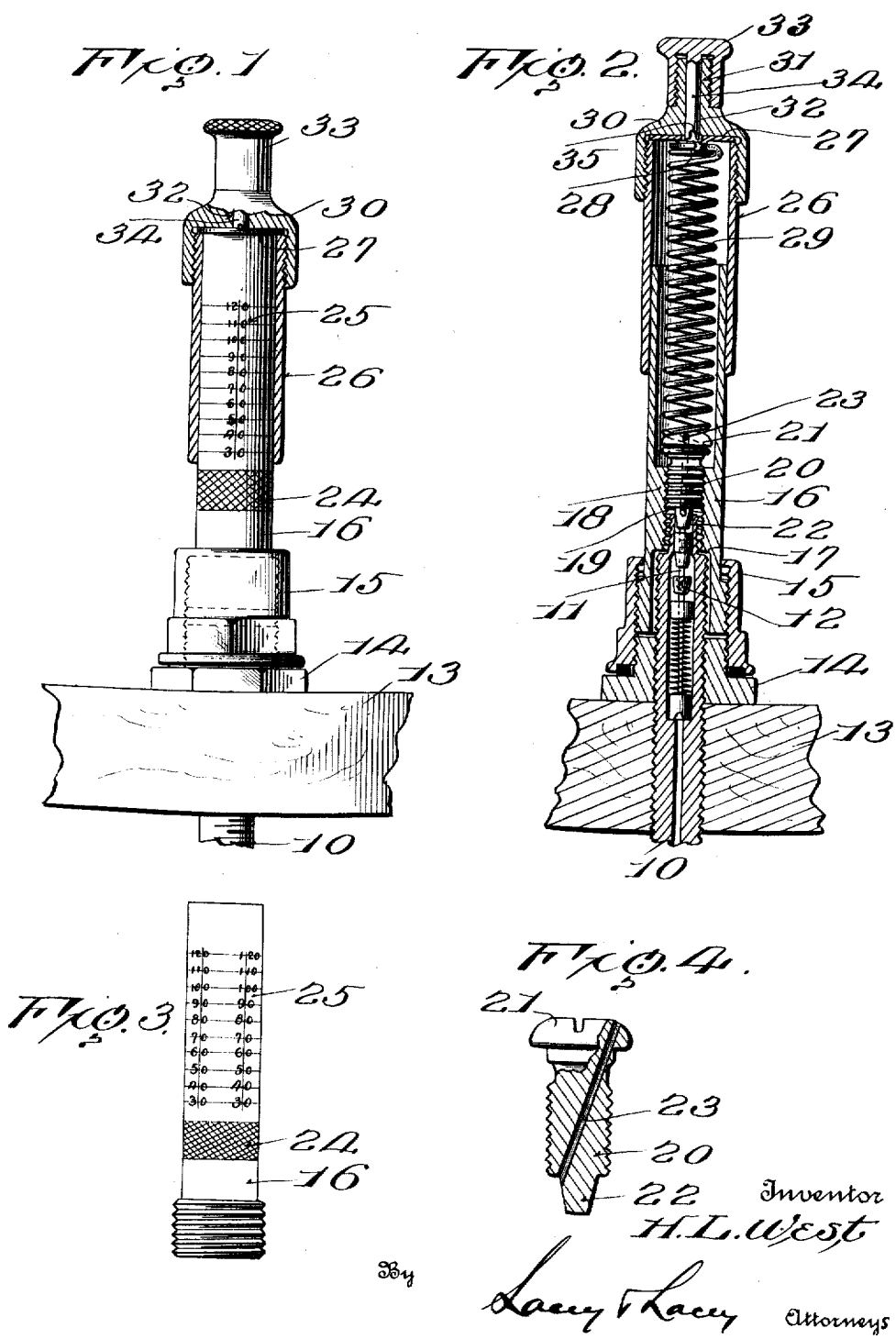

UNITED STATES PATENT OFFICE.

HARLEY L. WEST, OF CRESTED BUTTE, COLORADO, ASSIGNOR OF ONE-THIRD TO BEN L. CRESS, OF REDCLIFF, COLORADO.

PRESSURE-GAGE FOR VEHICLE-TIRES.

1,300,534.     Specification of Letters Patent.     Patented Apr. 15, 1919.

Application filed August 5, 1918. Serial No. 248,378.

*To all whom it may concern:*

Be it known that I, HARLEY L. WEST, citizen of the United States, residing at Crested Butte, in the county of Gunnison and State of Colorado, have invented certain new and useful Improvements in Pressure-Gages for Vehicle-Tires, of which the following is a specification.

This invention relates to an improved pressure gage and valve casing closure for motor vehicle tires and has as its primary object to provide a device of this character one of which may be attached to the valve casing of each of the wheel tires of a vehicle fitting over the said casings to be carried thereby upon the wheels of the vehicle.

The invention has as a further object to provide a device of this character which will normally allow the valve within the valve casing of the tire to remain closed so as to prevent escape of air from the tire but which may be manually adjusted for opening the said valve so as to obtain a reading of the gage.

A still further object of the invention is to provide a device employing a slidable gage sleeve held in its normal position by a suitable contractile spring, against the tension of which the sleeve is shifted for indicating the air pressure within the tire, and wherein the tension of the spring may be adjusted so that the gage may be maintained accurate.

A further object of the invention in this connection is to provide a construction wherein the spring will be connnected at one end with an anchoring screw therefor and wherein the said screw will be formed to provide a stud adapted to depress and open the valve within the valve casing of the tire in order to obtain a reading of the gage.

And the invention has as a still further object to provide a device of the above described character so constructed that air may be introduced into the tire without the necessity for the removal of the gage from the tire valve casing.

Other and incidental objects will appear as the description proceeds. In the drawings, wherein I have illustrated the preferred embodiment of the invention, and wherein similar reference characters designate corresponding parts throughout the several views:

Figure 1 is a side elevation showing the manner in which my improved device is applied to the valve casing of a tire upon a vehicle wheel, a portion of the wheel felly as well as the valve casing shown being conventionally illustrated, Fig. 2 is a vertical sectional view more particularly illustrating the details of construction of the device and showing the gage sleeve employed extended under air pressure of the tire, Fig. 3 is a view showing the barrel of the device in detail, and Fig. 4 is a view showing in detail the anchoring screw employed for the air pressure resisting spring of the gage sleeve.

Referring now more particularly to the drawings, I have shown my improved device in connection with a conventional type of motor vehicle tire valve casing 10 having the usual valve mechanism arranged therein, this valve mechanism including, as is well known, a reciprocable valve stem 11 terminating at its upper end adjacent the outer end of the casing and carrying a valve 12 which may be opened by depressing the stem. The valve casing is shown as being fitted through a wheel felly, a portion of which is conventionally shown at 13.

Coming now more particularly to the subject of the present invention, I employ a nut 14 which is threaded upon the valve casing to abut the inner face of the felly 13, as is customary, and threaded upon this nut is a coupling sleeve 15. The sleeve 15 is threaded upon the lower end of a barrel 16 by which the said sleeve is carried and, at its lower end, the barrel is cored out to provide a recess 17 freely receiving the outer extremity of the valve casing 10. Above this recess, the wall of the barrel is internally thickened to form a screw seat 18 defining a reduced passage 19 therethrough and, as will be noted upon reference to Fig. 2 of the drawings, the reduced nipple at the upper end of the valve casing 10 is freely received within the lower end portion of this passage. Threaded into the said passage upon the screw seat is an anchoring screw 20. This screw is provided at its upper end with a head 21 which is slotted to receive a screw driver or other similar tool for adjusting the screw within the passage while the said screw at its lower end is formed with a reduced stud 22 adapted to freely fit within the reduced nipple of the valve casing 10. Formed through the screw, as shown in detail in Fig. 4 of the drawings, is an air passage 23 establishing communication between the recess 17 and the outer end of the barrel.

As shown in Figs. 1 and 3 of the drawings, the barrel, adjacent its lower end, is provided with a knurled portion 24 which may be readily grasped for adjustably rotating the barrel within the coupling sleeve 15, and cut into the peripheral surface of the barrel or otherwise imposed thereon above this knurled portion are suitable graduations which, as particularly shown in Fig. 3, are respectively identified by the figures of a pressure scale 25, a number of these scales being preferably arranged at spaced points circumferentially about the barrel, in order that some one of the scales will always be easily within view. Slidably fitting over the barrel is a gage sleeve 26, the lower end of which is adapted to successively register with the graduations of the scales 25 upon the barrel for indicating a reading of the gage. This sleeve is held against displacement from the barrel by a plate or disk 27 adapted to overhang the upper end edge of the sleeve and provided axially with a flanged tubular shank 28 having its passage opening through the plate. Detachably engaging at one end around this shank to be held thereon by the shank flange, is a helical spring 29, the opposite end of which is engaged around the upper end of the screw 20 beneath the screw head 21. The plate 27 is thus operatively connected with the screw 21 and connecting the gage sleeve 26 with the said plate is a coupling head 30 threaded upon the upper end of the gage sleeve and receiving the plate therein so that the said plate is thus tightly held between the coupling head and the upper end of the gage sleeve. Thus, it will be seen that this coupling head serves to operatively connect the gage sleeve with the spring 29 so that the said spring will act to yieldably resist the pressure of air through the barrel into the said sleeve. Upstanding from the coupling head 30 is a reduced nipple 31 through which is axially formed a passage 32 entering through the head. This nipple is adapted to receive the conventional hose connection from a suitable source of air supply and normally carries a closure cap 33 threaded thereon and provided axially with a wrench shank 34 freely fitting through the passage 32 of the coupling head. At its lower end, said nipple is formed with a notched terminal 35 adapted for engagement with the valve structure of the casing 10 in the well known manner, for removing the valve.

Under ordinary conditions, the barrel 16 is carried upon the coupling sleeve 15 in such position that the stud 22 of the screw 20 is held out of the reduced nipple at the outer end of the casing 10. The valve 12 within the casing will thus seat to prevent the escape of air from the tire therethrough so that, as shown in Fig. 1, the gage may be carried upon the casing to provide a closure therefor. However, should it be desired to determine the air pressure within the tire, the sleeve 15 is first loosened and adjusted outwardly upon the nut 14. The barrel 16 may then be adjusted inwardly within the said sleeve to project the stud 22 of the screw 20 into the outer end of the casing in engagement with the stem 11 of the valve 12 for depressing the valve to open position. The air within the tire will thus be permitted to flow through the casing 10 and through the passage 23 in the screw 20 into the gage sleeve 26, when the pressure of air within this sleeve will act to shift this sleeve outwardly upon the barrel against the tension of the spring 29 for giving a reading of the air pressure within the tire at the graduation of any one of the scales 25 uncovered at the lower end of the sleeve. The gage may thus be readily manipulated for determining the air pressure within the tire and, of course, after a reading of such air pressure has been procured, the barrel 16 may again be adjusted outwardly within the sleeve 15 to free the valve 12 and the parts returned to their original normal position, as shown in Fig. 1, when the valve will again prevent escape of air from the tire. In order to introduce air into the tire it is simply necessary to remove the cap 33 and apply a hose connection from a suitable source of air supply to the nipple 31 when the air will flow through the barrel and past the valve 12 to the tire.

Attention is now directed to the fact that should the tension of the spring 29 become weakened through the constant flexing of the said spring, the coupling head 30 may be removed when the shank of a screw driver or other suitable tool may then be inserted through the tubular shank 28 of the plate 27 as well as through the spring 29 and engaged in the slot of the head 21 of the screw 20 so that this screw may thus be adjusted within the passage 19 for regulating the tension of the spring. Obviously, this feature of the present invention constitutes a very advantageous arrangement in view of the desirability of maintaining the gage accurate. Furthermore, it is to be observed that the screw 20 while providing an anchoring means for the lower end of the screw, is also formed to coöperate with the valve in the valve casing 10 for opening this valve upon the proper adjustment of the barrel 16. A dual function of the screw is thus obtained. It will accordingly be seen that I provide a highly effective construction for the purpose set forth and a device which is adapted for attachment to substantially any conventional type of motor vehicle tire valve casing and is thus adapted for general use.

Having thus described the invention, what is claimed as new is:

1. A device of the character described including a barrel, a gage sleeve slidable thereon, yieldable means adapted to resist outward sliding movement of the said sleeve, the barrel being adapted for connection with a tire valve casing, and means carried by the barrel and adapted to open the valve within the casing upon the inward adjustment of the barrel upon said casing for establishing communication through the casing into the said sleeve.

2. A device of the character described including a barrel, a gage sleeve slidable thereon, yieldable means connected with the sleeve and adapted to resist outward sliding movement thereof upon the barrel, valve engaging means carried by the barrel, and means for connecting the barrel with a tire valve casing for adjustment with respect to the said casing to engage said last mentioned means with the tire valve to open said valve.

3. A device of the character described including a barrel, a gage sleeve slidable thereon, tire valve engaging means carried by the barrel, yieldable means operatively connected at one end with the sleeve and at its opposite end with the said means for resisting outward sliding movement of the sleeve upon the barrel, and means for adjustably connecting the barrel with a tire valve casing.

4. A device of the character described including a barrel, tire valve engaging means carried thereby, a gage sleeve slidable upon the barrel, yieldable means operatively connected at one end with the sleeve and at its opposite end with said valve engaging means for resisting outward sliding movement of the sleeve upon the barrel, the said valve engaging means being adjustable for regulating the tension of the said yieldable means, and means for adjustably connecting the barrel with a tire valve casing.

5. A device of the character described including a barrel, a gage sleeve slidable thereon, a screw adjustable within the barrel and adapted for engagement with a tire valve, yieldable means operatively connected at one end with the sleeve and at its opposite end with said screw for resisting outward sliding movement of the sleeve, and means for adjustably connecting the barrel with a tire valve casing.

6. A device of the character described including a barrel provided intermediate of its ends with a reduced passage, tire valve engaging means engaged within the said passage and having an air passage formed therethrough establishing communication between the ends of the barrel, a gage sleeve slidable upon the barrel, yieldable means operatively connected at one end with said sleeve and at its opposite end with said valve engaging means for resisting outward sliding movement of the sleeve, and means for adjustably connecting the barrel with a tire valve casing.

7. A device of the character described including a barrel, a gage sleeve slidable thereon, tire valve engaging means carried by the barrel, yieldable means operatively connected at one end with the barrel, means connected with the opposite end of said yieldable means and overhanging the outer end of the sleeve, a coupling head connecting the sleeve with said last mentioned means whereby said yieldable means will resist outward sliding movement of the sleeve, and means for adjustably connecting the barrel with a tire valve casing.

8. A device of the character described including a barrel, tire valve engaging means carried thereby, a gage sleeve slidable upon the barrel, yieldable means operatively connected at one end with the barrel, means carried by the opposite end of said yieldable means and overhanging the outer end of said sleeve, a coupling head connecting the sleeve with said last mentioned means whereby said yieldable means will resist outward sliding movement of the sleeve, the said coupling head being formed with a tire inflating passage therethrough, a cap carried by the said head and normally closing the said passage, and means for adjustably connecting the barrel with a tire valve casing.

In testimony whereof I affix my signature.

HARLEY L. WEST. [L. S.]

Copies of this patent may be obtained for five cents each, by addressing the "Commissioner of Patents, Washington, D. C."